US012539629B2

(12) United States Patent
Brown et al.

(10) Patent No.: US 12,539,629 B2
(45) Date of Patent: Feb. 3, 2026

(54) ADJUSTABLE HAIR CLIPPER BLADE ASSEMBLY

(71) Applicant: WezTeck LLC, Murrieta, CA (US)

(72) Inventors: Reginald Weston Brown, Murietta, CA (US); David Lee, Pomona, CA (US)

(73) Assignee: WezTeck LLC, Murrieta, CA (US)

( * ) Notice: Subject to any disclaimer, the term of this patent is extended or adjusted under 35 U.S.C. 154(b) by 314 days.

(21) Appl. No.: 18/104,745

(22) Filed: Feb. 1, 2023

(65) Prior Publication Data

US 2023/0241790 A1 Aug. 3, 2023

(51) Int. Cl.

*B26B 19/20* (2006.01)
*B26B 19/04* (2006.01)
*B26B 19/38* (2006.01)

(52) U.S. Cl.

CPC .............. *B26B 19/20* (2013.01); *B26B 19/04* (2013.01); *B26B 19/38* (2013.01)

(58) Field of Classification Search

CPC ....... B26B 19/04; B26B 19/06; B26B 19/063; B26B 19/066; B26B 19/20; B26B 19/205; B26B 19/24; B26B 19/38; B26B 19/3806; B26B 19/3813; B26B 19/382; B26B 19/3846; B26B 19/386; B26B 19/3873; B26B 19/3886; B26B 19/3893; B26B 19/44; B26B 19/46; B26B 21/521; B26B 19/02; A45D 24/36

See application file for complete search history.

(56) References Cited

U.S. PATENT DOCUMENTS

| | | | | |
|---|---|---|---|---|
| 2,624,113 | A | 1/1953 | Giorgi | |
| 2,916,820 | A * | 12/1959 | Clark | B26B 19/20 30/201 |
| 8,844,142 | B2 * | 9/2014 | Kammer | B26B 19/20 30/201 |
| 10,780,594 | B1 | 9/2020 | Chen | |
| 2012/0279073 | A1 | 11/2012 | Snow et al. | |
| 2013/0214724 | A1 * | 8/2013 | Werner | B60L 58/22 320/103 |
| 2021/0046662 | A1 | 2/2021 | Eijkelkamp et al. | |

* cited by examiner

*Primary Examiner* — Adam J Eiseman
*Assistant Examiner* — Haleigh N Watson
(74) *Attorney, Agent, or Firm* — Avyno Law P.C.

(57) ABSTRACT

An adjustable hair clipper blade assembly is provided for attachment to hair clippers. The adjustable hair clipper blade assembly includes a stationary blade assembly and a guard attachment. The stationary blade assembly includes a stationary blade having a lever mounted on the front of the stationary blade for interfacing with the rear side of a guard attachment that is moveably secured against the stationary blade. The lever moves the guard attachment in a first direction when the lever is moved in a first direction and moves the guard attachment in a second direction with the lever is moved in a second direction.

17 Claims, 16 Drawing Sheets

ADJUSTABLE HAIR CLIPPER BLADE ASSEMBLY

TECHNICAL FIELD

The invention relates to hair clippers and in particular, to a hair clipper blade having a guard attached to the clipper blade that can be adjusted between predetermined positioned to change the amount of hair being cut by the blade of the hair clippers.

BACKGROUND

Hair clippers have long been used to trim the hair of individuals. While hair clippers can be manual, the majority of those available and used today are electric hair clippers. By way of example, FIG. 1 is a rear view of an electric hair clipper 100 of the prior art. FIG. 2 is a perspective view of the right rear side of the electric hair clippers 100 of FIG. 1.

As seen in prior art FIGS. 1 and 2, hair clippers 100 includes a set of cutting blades 102 and 104, each of which include small, sharpened comb-like teeth in close contact with one other. The set of blades 102, 104 is attached to a housing 106 that is typically designed to be held comfortably in the hand of a user. One blade 102 in the set of blades 102, 104 is a stationary blade 102, while the other blade 104 in the set of blades 102, 104 is a movable blade 104. The movable blade 104 is positioned behind the stationary blade 102, between the stationary blade 102 and housing 106 such that the teeth of each blade 102, 104 are aligned and in contact with one another. A motor (not shown) is positioned in the housing 106 and is in communication with the movable blade 104 to rapidly move the moveable blade 104 relative to the stationary blade 102 along the horizontal axis (x-x) of the hair clippers 100. When hair is positioned between the comb-like teeth of the set of blades 102, 104, the movement of the one blade 102 relative to the other blade 104 causes the set of blades 102, 104 to cut the hair, much like a pair of scissors.

In most hair clippers 100, the set of cutting blades 102 and 104 are removable. Generally, the movable blade 104 is held in place by the securing of the stationary blade 102 on the housing 106. As shown, the stationary blade 104 is secured to the housing 106 by two screws 108 spaced apart a distance that is standard for most professional hair clippers. Some hair clippers 100 are also provided with an adjustable lever 110 for raising or lower the stationary blade 104 relative to the cutting blade 102, which provides a slight adjustment when cutting.

To regulate how close the blades of the hair clippers may come to a person's scalp, and thus, control the length of hair that can be cut by the blades, hair clippers are accompanied by attachments, also known as guards or clipper guards, that come in various lengths and sizes, having varying angles and curvatures, for different cutting techniques. For example, different attachments may be used for cutting, blending, detailing, or outlining by controlling the length and angle of a cut.

Clipper guards or guard attachments are usually plastic attachments that snap on to the stationary blade of the set of cutting blades. To create a uniform cutting length, various sized clipper guards are used, which each evenly cover the teeth on the set of cutting blades to achieve a desired cutting length. Standard guard sizes range from 0 to 8, starting with a length of $1/16^{th}$ of an inch and increasing incrementally in size to 1 inch. Right and left angled guards (R, L) may also be used for trimming around the ears of a user.

Clipper guards can, however, be very inconvenient to use. To cut at a particular length or impart a particular technique, one must attach the desired guard corresponding to the desired cut length. If a hairstylist is cutting hair at different lengths, the stylist is required to stop and change the guard each time the stylist desires to alter the cutting length or cutting style. A need therefore exists for a clipper blade with an adjustable cutting guard to minimize the number of times a stylist is required to detach and reattached guards.

SUMMARY

To address the foregoing problems, in whole or in part, and/or other problems that may have been observed by persons skilled in the art, the present application provides methods, processes, systems, apparatus, instruments, and/or devices, as described by way of example in implementations set forth below.

According to one implementation of the present invention, an adjustable clipper blade assembly is provided. The adjustable clipper blade assembly includes a stationary blade assembly and guard attachment or cutting guard. The stationary blade assembly includes a stationary blade having a double acting spring lever positioned on that stationary blade that interfaces with a track on the rear side of the guard attachment. The stationary blade includes front and rear faces, a toothed edge, a bottom edge and two opposing side edges. The double acting spring lever is pivotally attached to the front face of the stationary blade near the center of the bottom edge of the stationary blade using a double acting spring hinge. The double acting spring lever includes an arm and pin positioned near the center of the front face of the stationary blade assembly. The guard attachment includes two opposing side channels that moveably engage with the opposing side edges of the stationary blade. When the side channels of the guard attachment engage with the opposing side edges of the stationary blade, the pin in the double acting spring lever aligns with the track of the guard attachment. The track of the guard attachment includes both left and right side tracks with at least four peg positioned within the track. The track and pegs allow the guard attachment to incrementally move upward relative to the stationary blade when the double acting spring lever is moved in a first direction and to incrementally move downward relative to the stationary blade when the double acting spring lever is moved is a second direction. When the lever is moved in a first direction, the pin moves on one side of the track to move the guard attachment in a first direction. When the lever is moved in a second direction, the pin moves on the opposing side of the track to move the guard attachment in a second direction.

In another implementation of the present invention, hair clippers are provided. The hair clippers include a housing and a set of cutting blades. The set of cutting blades including both a stationary blade having teeth and a moveable blade having teeth, with the movable blade positioned between the stationary blade and the housing such that the teeth of the movable blade are in alignment with the teeth of the stationary blade. The stationary blade includes a lever for interfacing with a guard attachment that is moveably secured against the stationary blade. The lever is capable of moving the guard attachment in a first direction when the lever is moved in a first direction and moving the guard attachment in a second direction with the lever is moved in a second direction.

In accordance with another example, an adjustable clipper blade assembly is provided for use with hair clippers. The adjustable clipper blade assembly includes a stationary blade assembly having front and rear faces, a toothed edge, a bottom edge and opposing side edges. A lever arm is pivotally attached to the front face of the stationary blade. The lever arm has at least one pin extending from the lever arm perpendicular to the front face of the stationary blade. A guard attachment is moveably attached to the stationary blade. The guard attachment has a base portion with teeth extending from the base portion. The base portion of the guard attachment further includes a track for engaging the pin on the lever arm, whereby the movement of the lever arm moves the pin along the track of the guard attachment causing the guard attachment to move relative to the stationary blade assembly in predetermined increments.

In this example, the lever arm may be a double acting spring lever pivotally attached to the front face of the stationary blade. The guard attachment may include two opposing side channels that moveably engage with the opposing side edges of the stationary blade. Further, the track of the guard attachment may include both left and right side tracks with at least four pegs for allowing the guard attachment to incrementally move upward relative to the stationary blade when the double acting spring lever is moved in a first direction and to incrementally move downward relative to the stationary blade when the double acting spring lever in moved in a second direction.

In still another example, an adjustable clipper blade assembly is provided for use with hair clippers. The adjustable clipper blade assembly includes a stationary blade having a toothed edge, a bottom edge and two opposing side edges. The stationary blade has a lever attached to the stationary blade. The adjustable clipper blade assembly further includes a guard attachment having two opposing side channels for moveably securing the guard attachment to a stationary blade, whereby the lever of the stationary blade interfaces with the guard attachment to move the guard attachment relative to the stationary blade.

In this example, the lever may move the guard attachment in a first direction when the lever is moved in a first direction and move the guard attachment in a second direction when the lever is moved in a second direction. The stationary blade may include a front face and a rear face and the lever may be a double acting spring lever pivotally attached to the front face of the stationary blade. The lever may further include an arm having a pin. The two opposing side channels of the guard attachment may moveably engage the opposing side edges of the stationary blade. The guard attachment may include a base portion with teeth extending from the base portion. The base portion may further include a track for engaging the pin on the lever. The movement of the lever may move the pin in the track of the guard attachment causing the guard attachment to move relative to the stationary blade assembly.

The track of the guard attachment may include both left and right (or first and second) side tracks with at least two pegs positioned within the track for allowing the guard attachment to incrementally move upward relative to the stationary blade when the double acting spring lever is moved in a first direction. The guard attachment is then incrementally move downward relative to the stationary blade when the double acting spring lever is moved in a second direction. In another example, the track may include at least three pegs, at least four pegs or at least five or more pegs.

Additionally, hair clippers for cutting hair may also be provided, where the hair clippers include a housing having a set of cutting blades attached to the housing. The set of cutting blades including both a stationary blade having teeth and a moveable blade having teeth, where the movable blade is positioned between the stationary blade and the housing with the teeth of the movable blade in approximate alignment with the teeth of the stationary blade. The stationary blade further including a lever attached to the stationary blade for interfacing with a guard attachment that is moveably secured against the stationary blade.

In this example, the lever may move the guard attachment in a first direction and second direction. When the lever is moved in a first direction the guard attachment is moved in a first direction. When the lever is moved in a second direction the guard attachment is moved in a second direction. The first direction may be an upward direction and the second direction may be a downward direction.

Like with other examples, the stationary blade may have a front and rear face and the lever may be a double acting spring lever pivotally attached to the front face of the stationary blade. The guard attachment may include two opposing side channels that moveably engage with opposing side edges of the stationary blade. The lever may include an arm having a pin and the guard attachment may include a base portion with teeth extending from the base portion. The base portion may include at least one track for engaging at least one pin on the lever. The movement of the lever may move the pin in the at least one track of the guard attachment causing the guard attachment to move relative to the stationary blade assembly. The track on the guard attachment may further include both left and right side tracks with at least two pegs for allowing the guard attachment to incrementally move upward relative to the stationary blade when the double acting spring lever is moved in a first direction and to incrementally move downward relative to the stationary blade when the double acting spring lever is moved in a second direction.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

In this application, all "aspects," "examples," "embodiments," and "implementations" described are considered to be non-limiting and non-exclusive. Accordingly, the fact that a specific "aspect," "example," "embodiment," or "implementation" is explicitly described herein does not exclude other "aspects," "examples," "embodiments," and "implementations" from the scope of the present disclosure even if not explicitly described. In this disclosure, the terms "aspect," "example," "embodiment," and "implementation" are used interchangeably, i.e., are considered to have interchangeable meanings.

In this application, the term "substantially," "approximately," or "about," when modifying a specified numerical value, may be taken to encompass a range of values that include +/−10% of such numerical value. Further, such as "communicate," and "in . . . communication with," or "interfaces" or "interfaces with" (for example, a first component "communicates with" or "is in communication with" a second component) are used herein to indicate a structural, functional, mechanical, electrical, signal, optical, magnetic, electromagnetic, ionic or fluidic relationship between two or more components or elements. As such, the fact that one component is said to communicate or interface with a second component is not intended to exclude the possibility that additional components may be present between, and/or operatively associated or engaged with, the first and second components.

Figure 1:
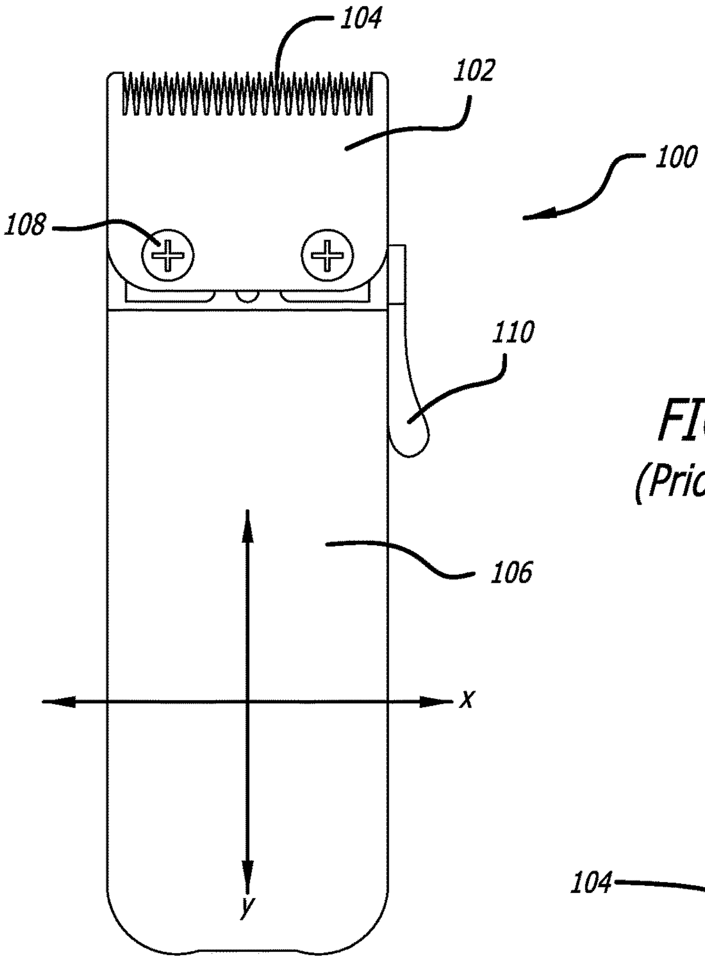
FIG. 1 (Prior Art)
FIG. 1 (Prior Art) is a rear view of electric hair clippers of the prior art.
Figure 2:
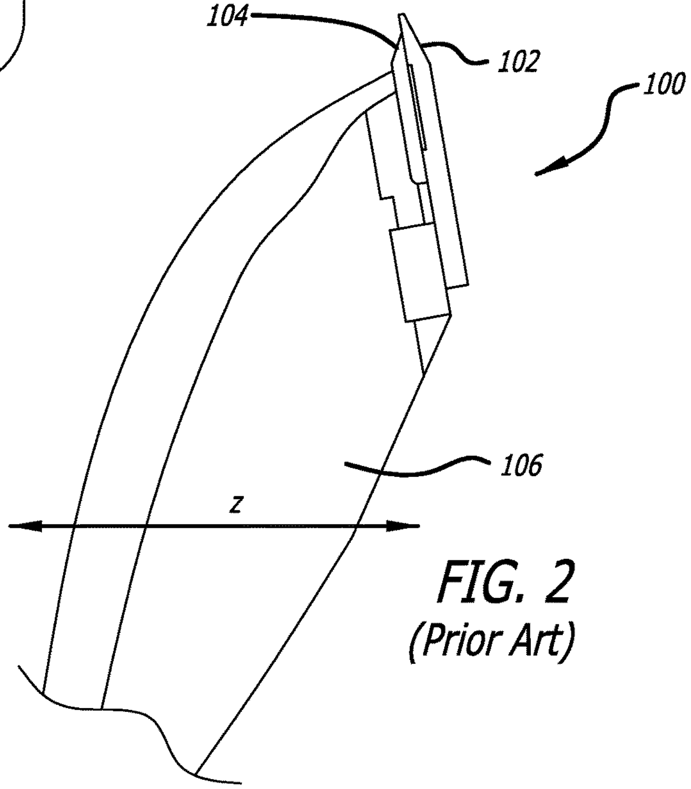
FIG. 2 (Prior Art)
FIG. 2 (Prior Art) is a perspective view of the right rear side of the prior art electric hair clippers of FIG. 1.

As shown in FIGS. 3-23, the present invention relates to an adjustable clipper blade assembly that includes both a stationary blade assembly 300 and guard attachment 600, 900 or 1200. As shown below, the stationary blade assembly 300 of the present invention is designed to be used in place of the standard stationary blade 102 (PRIOR ART FIGS. 1 & 2) with a guard attachment 600, 900 or 1200 designed to mate with the stationary blade assembly 300.

For purposes of reference and description, hair clippers 100 are considered to have horizontal (x-axis) and vertical device axis (y-axis) (FIG. 1) and a z-axis (FIG. 2) along which the components of the hair clippers are positioned relative to each other. Terms such as "axial" and "axially" are assumed to refer to the respective axis or any direction or axis parallel to the device axis, unless indicated otherwise or the context dictates otherwise. For convenience, movement relative to a device axis may alternatively encompass movement relative to an axis that is parallel to the device axis that is specifically illustrated in FIGS. 1 & 2, unless the context dictates otherwise. Thus, linear translation "along the device axis z" is not limited to translation directly on (coincident with) the device axis, but also encompasses translation parallel to the device axis z, depending on the context. Similarly, rotation "about the device axis y" also encompasses rotation about an axis that is parallel to the device axis y, depending on the context.

Figure 3:
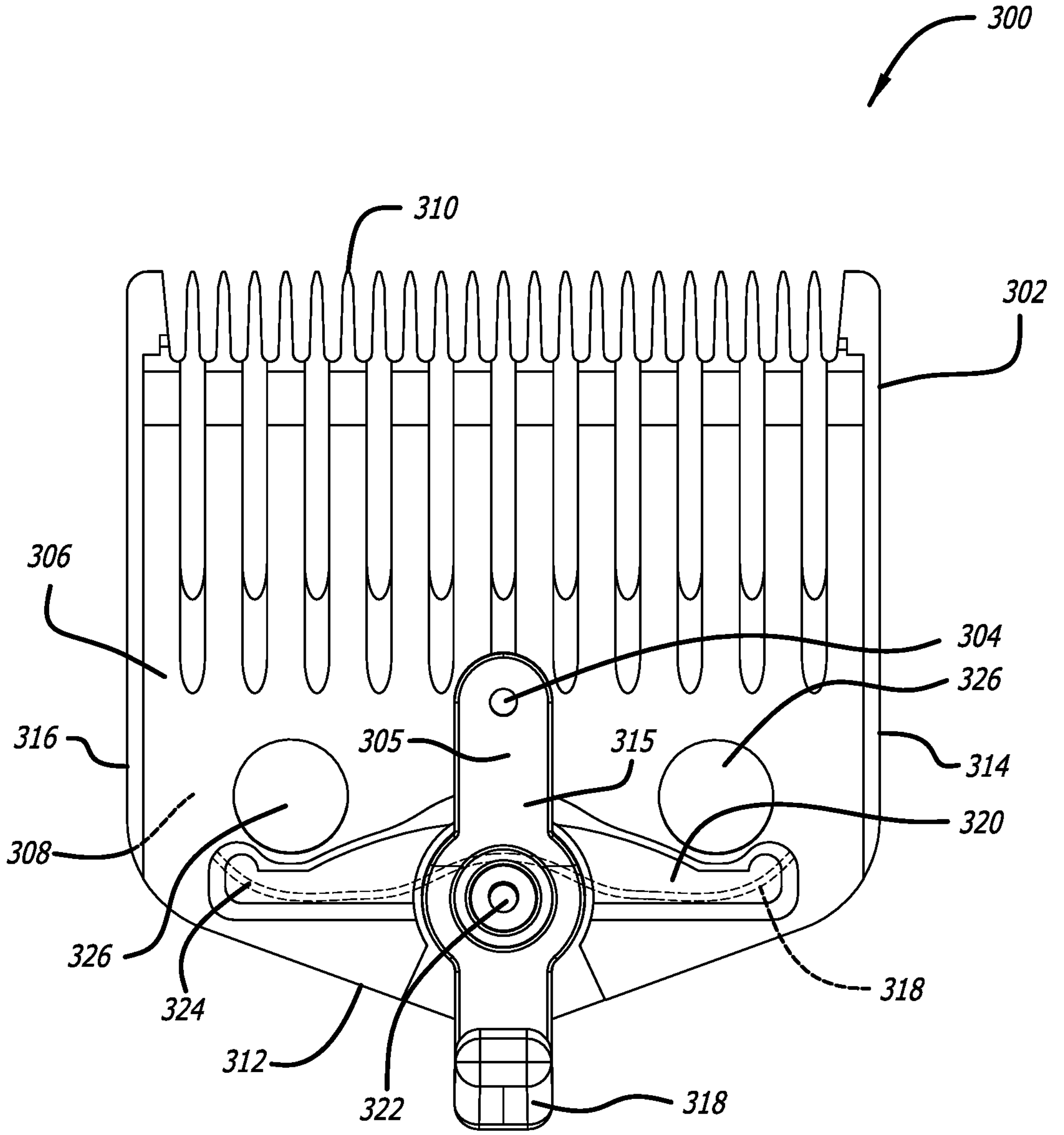
FIG. 3 is a front view of a stationary blade assembly of the present invention.

FIG. 3 is a front view of a stationary blade assembly 300 of the present invention. The stationary blade assembly 300 includes a stationary blade 302 having a front face 306, rear face 308, toothed edge 310, bottom edge 312 and two opposing side edges 314, 316. A double acting spring-loaded lever 305 is pivotally attached to the front face 306 of the stationary blade 302 near the center of the bottom edge 312 of the stationary blade 302. The double acting spring-loaded lever 305 is pivotally connected to the stationary blade 302 at pivot connection 322 and uses a spring wire 324 to place tension on the pivot connection in both the clockwise and counterclockwise directions. A cover 320 is used to keep the spring wire 324 in place against the stationary blade 302 and pivot connection 322.

Figure 16:
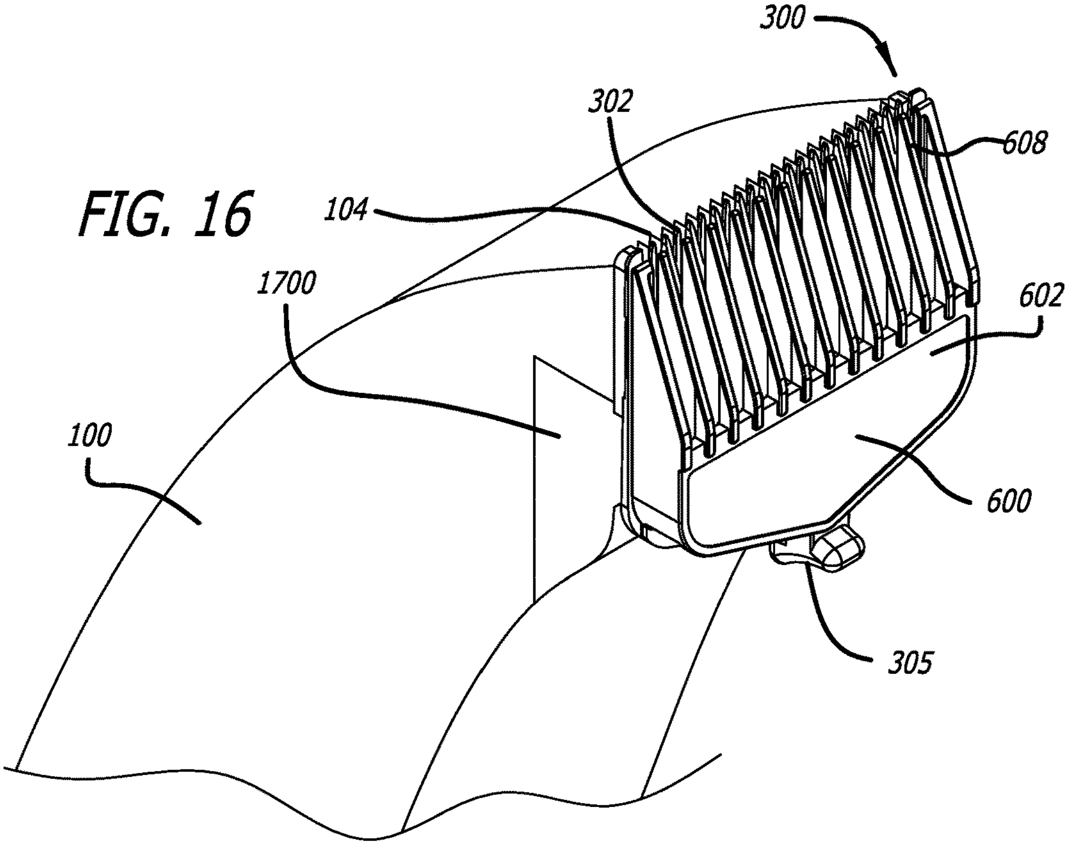
FIG. 16 is a perspective view of the right rear side of electric hair clippers with the adjustable clipper blade assembly attached to the electric hair clippers.

The lever 305 includes an actuator 318 at its bottom and an arm 315 having a pin 304 near the top of the arm 315. The actuator 318 extends below the bottom edge 312 of the stationary blade 302 for engagement by a user. The pin 304 is positioned near the center of the front face 306 of the stationary blade 302. The stationary blade 302 further includes two openings 326 for securing the stationary blade 302 against the housing of hair clippers, for example, the housing 106 of hair clippers 100, using screws 108 (FIG. 1) or screws 1600 (FIG. 16).

Figure 4:
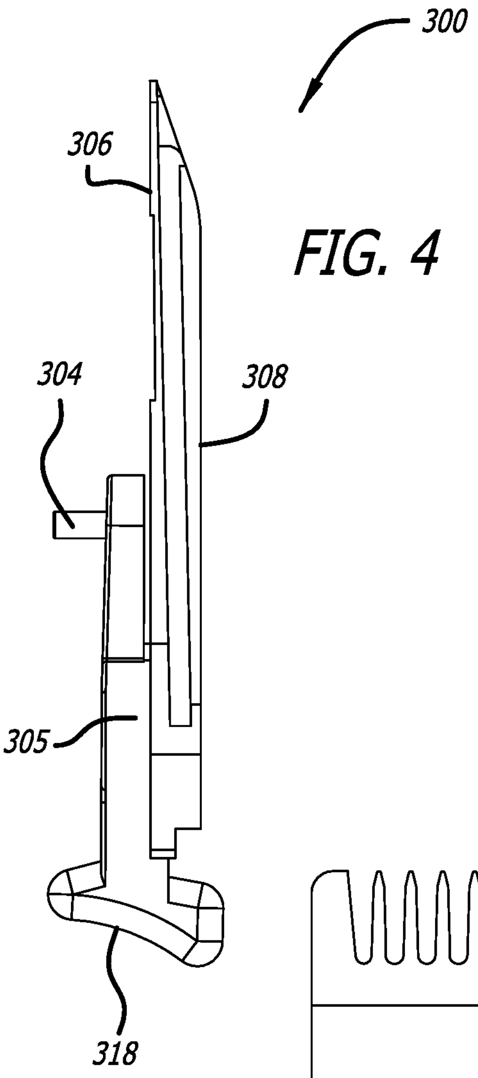
FIG. 4 is a perspective view of the right side of the stationary blade assembly of FIG. 3.
Figure 5:
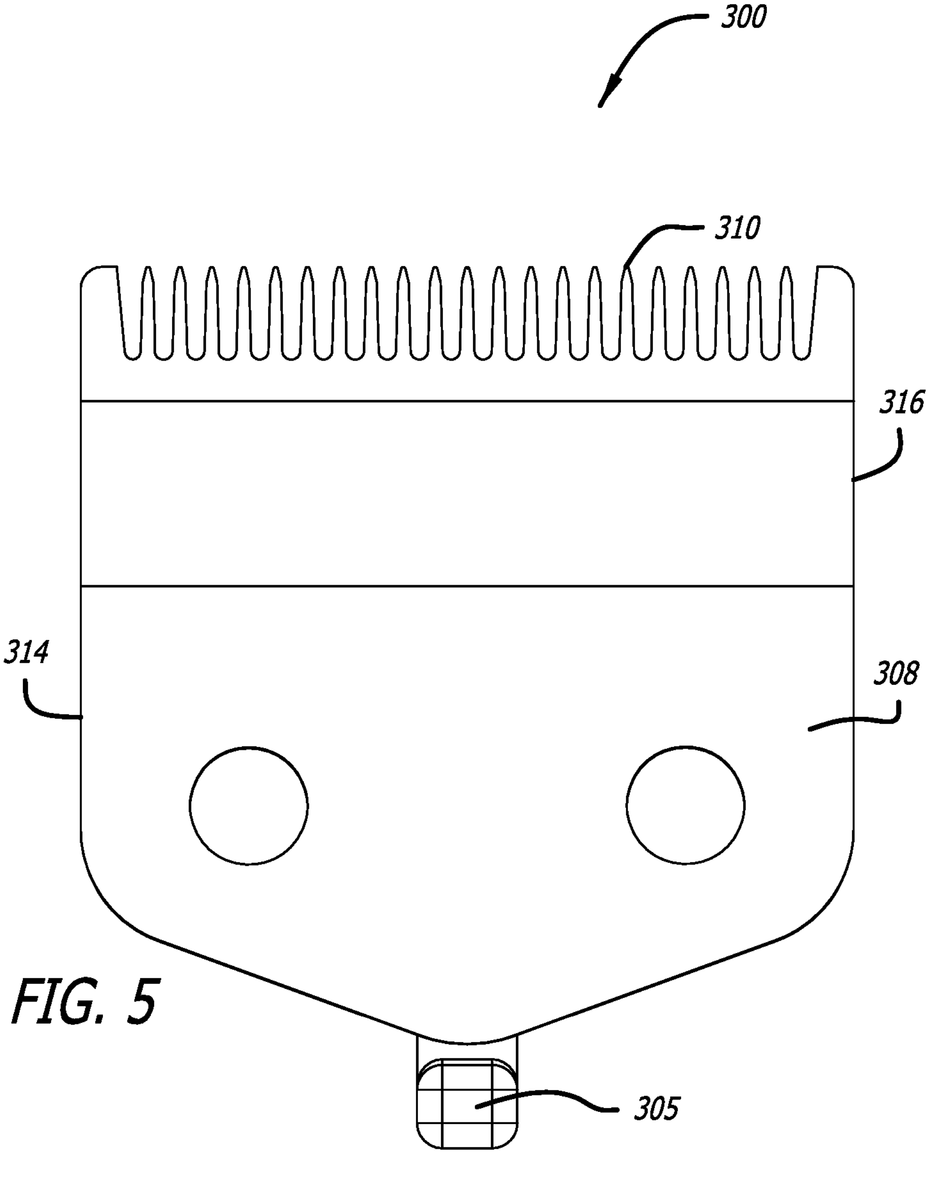
FIG. 5 is a rear view of the stationary blade assembly of FIG. 3.

FIG. 4 is a perspective view of the right side of the stationary blade assembly 300 of FIG. 3, and FIG. 5 is a rear view of the stationary blade assembly 300 of FIG. 3. As seen in FIG. 4, the two opposing side edges 314, 316 have a thickness. As shown in FIG. 5, the rear 308 of the stationary blade 302 is flat for mating in a flush manner against a moving blade, like the moving blade 104 of FIG. 1.

As illustrated in FIGS. 6-22, the stationary blade assembly 300 of FIGS. 3-5 is designed to mate with not only the housing and moving blade of hair clippers, but also with a number of different guard attachments, which as explained above, regulate how close the blades of the hair clippers may come to a person's scalp and control the length of hair that can be cut by the blades. As further explained below, the guard attachments also include teeth of varying angles and curvatures for imparting different cutting techniques. As explained further below, the present invention minimizes the number of guard attachments required by providing an adjustable hair blade assembly that allows for the adjustment of the length of the teeth on a guard attachment relative to the stationary, blade assembly 300. While a number of different guard attachments of varying teeth length, angle and curvature can be used, FIGS. 6-8, FIGS. 9-11 and FIGS. 12-14 provide three example of different guard attachments 600, 900, 1200 that can mate with the stationary blade assembly 300. Those skilled in the art will recognize that the examples shown in FIGS. 6-8, FIGS. 9-11 and FIGS. 12-14 are exemplary only and that other designs can be used without departing from the scope of the invention.

Figure 6:
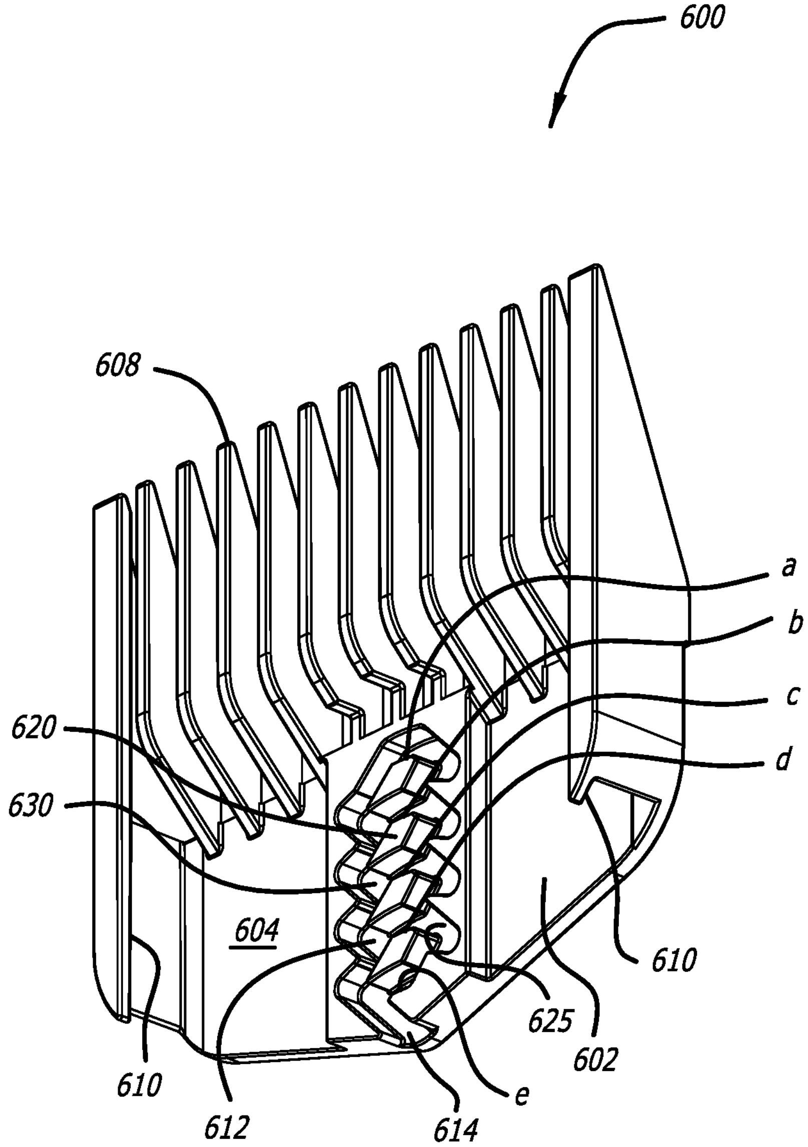
FIG. 6 is a perspective view of the rear of a guard attachment of the present invention.
Figure 7:
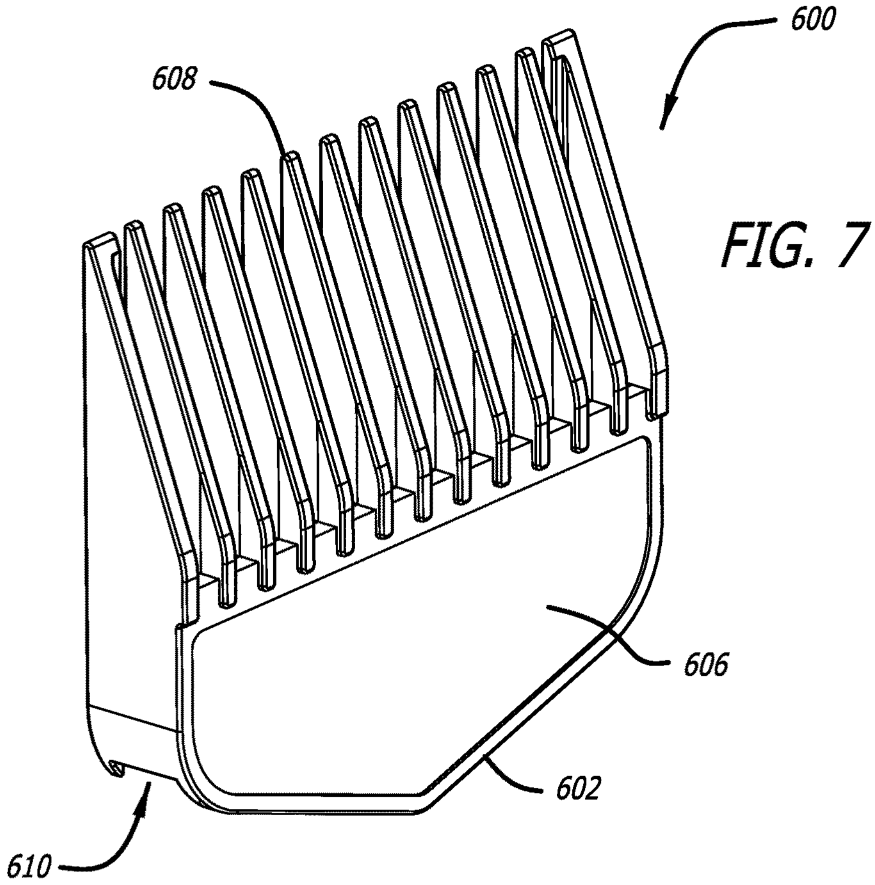
FIG. 7 is a perspective view of the front of the guard attachment of FIG. 6.
Figure 8:
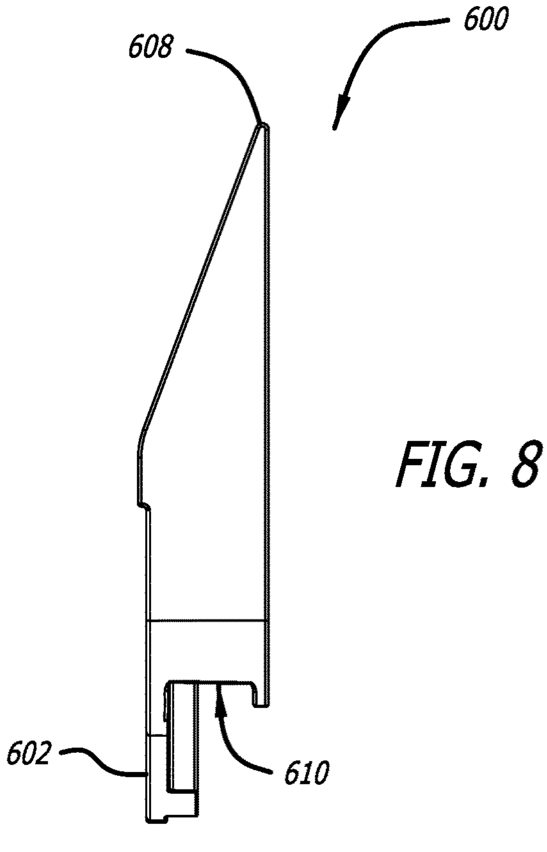
FIG. 8 is a perspective view of the right side of the guard attachment of FIG. 6.

FIGS. 6-8 show a first example of a guard attachment 600. FIG. 6 is a perspective view of the rear of a guard attachment 600. FIG. 7 is a perspective view of the front of the guard attachment 600, and FIG. 8 is a perspective view of the right side of the guard attachment 600.

The guard attachment 600 includes a base portion 602 having a rear side 604 and a front side 606. The guard attachment 600 further includes guard teeth 608 extending from the top of the base portion 602 of the guard attachment 600. In this example, the teeth 608 of the guard attachment 600, as they extend from the base portion 602, are angled downward without any curvature, at approximately a 20-21 degree angle.

Extending upward, toward the rear side 604 of the guard attachment 600, on both opposing sides of the base portion 602, are channel members 610. The channel members 610 are designed to slide over the two opposing sides 314, 316 of the stationary blade 302. The channel members 610 moveably engage the two opposing sides 314, 316 of the stationary blade 302 and allow the guard attachment 600 to move up and down relative to the stationary blade 302 while maintaining contact with the stationary blade 302.

Track 612 is also provided on the rear side 604 of the base portion 602 of the guard attachment 600. Track 612 receives the pin 304 of the lever 305 at track opening 614. The track 612 in the present example guides the pin 304 up and down the track 612, allowing the pin 304 to come to a resting state in five different positions (a-e), resting against the edge of the track 612 (e) and the top of pegs 620 (a-d) positioned in the middle of the track 612. The track 612 further includes a first or right side 625 and second or left side 630 which guide the pin 304 in one direction on the first side 625 of the track and a second direction on the second side 630 of the track 612. Moving the lever 305 in one direction will cause the guard attachment 600 to move upward in a vertical direction relative to the stationary blade 300, and moving the lever 305 in a second direction will cause the guard attachment 600 to move downward in a vertical direction relative to the stationary blade 300.

Figure 9:
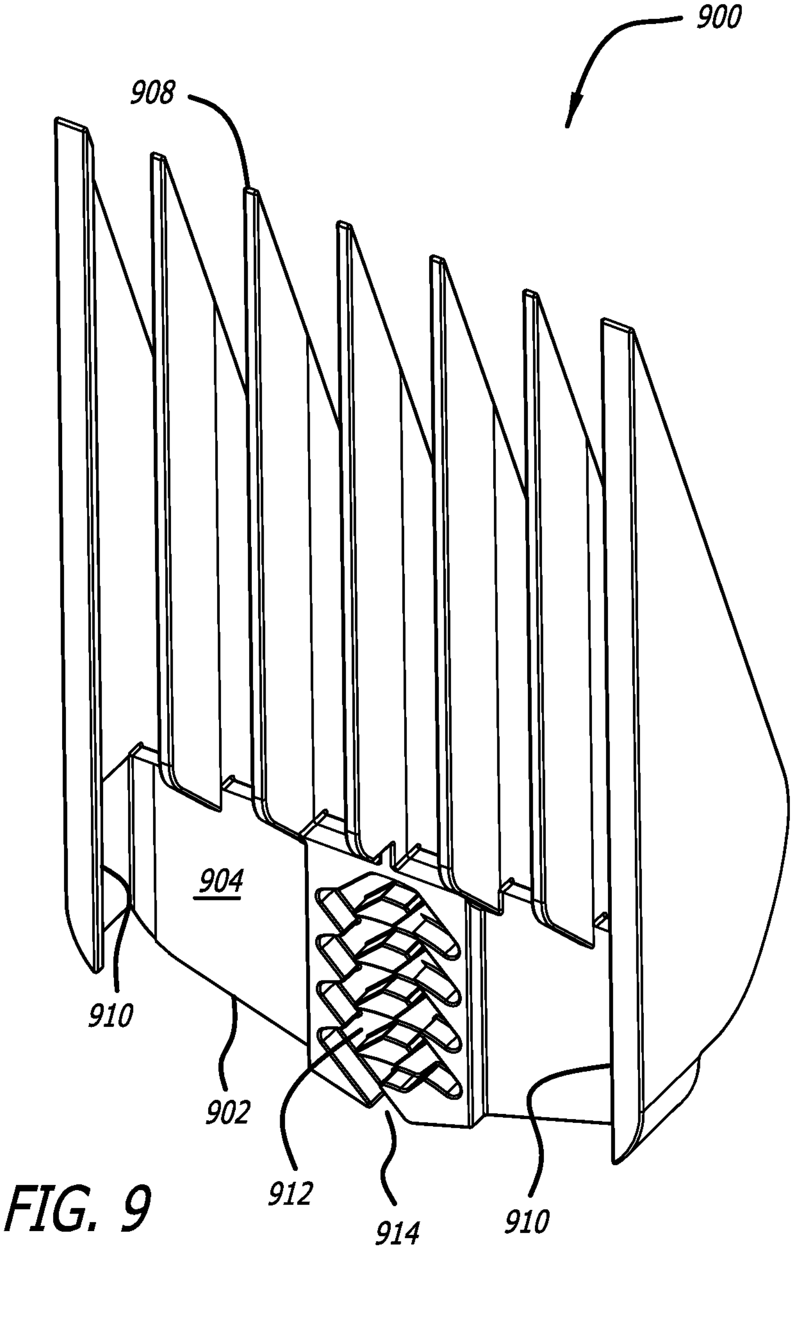
FIG. 9 is a perspective view of the rear of an alternative implementation of a guard attachment of the present invention.
Figure 10:
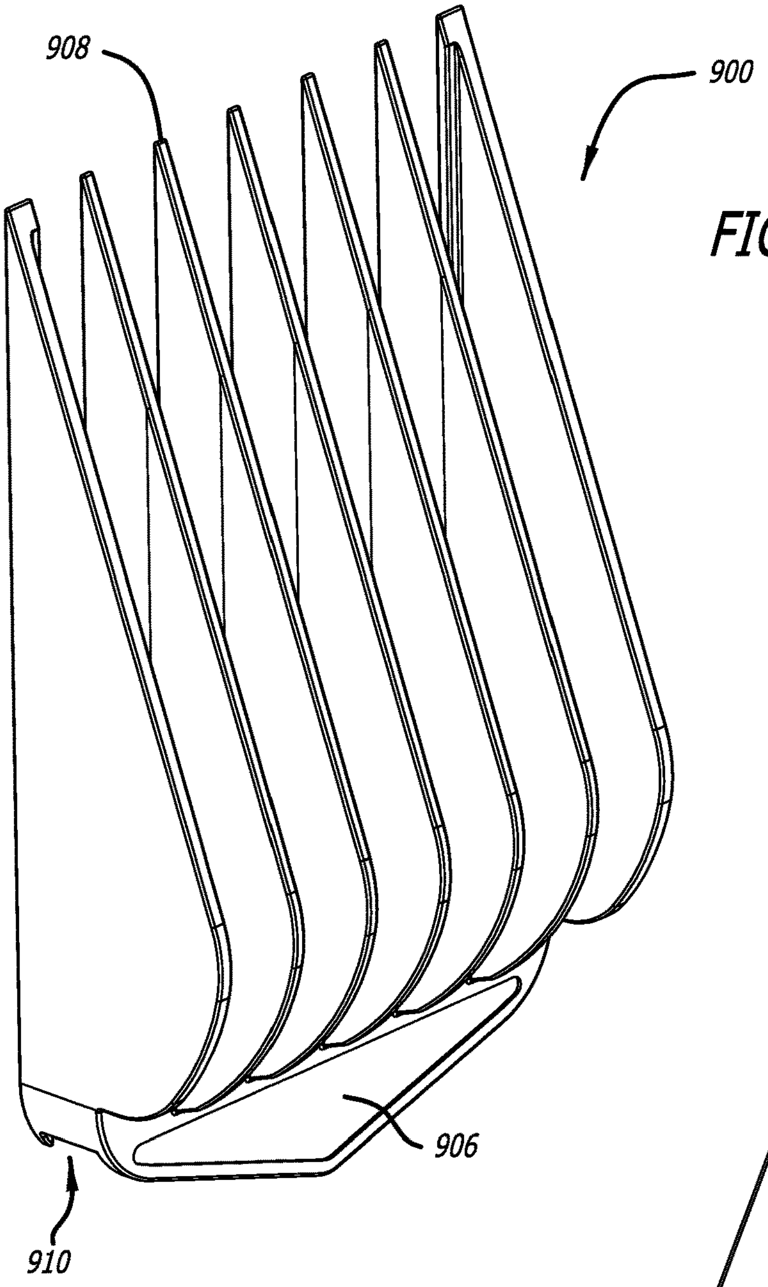
FIG. 10 is a perspective view of the front of the guard attachment of FIG. 9.
Figure 11:
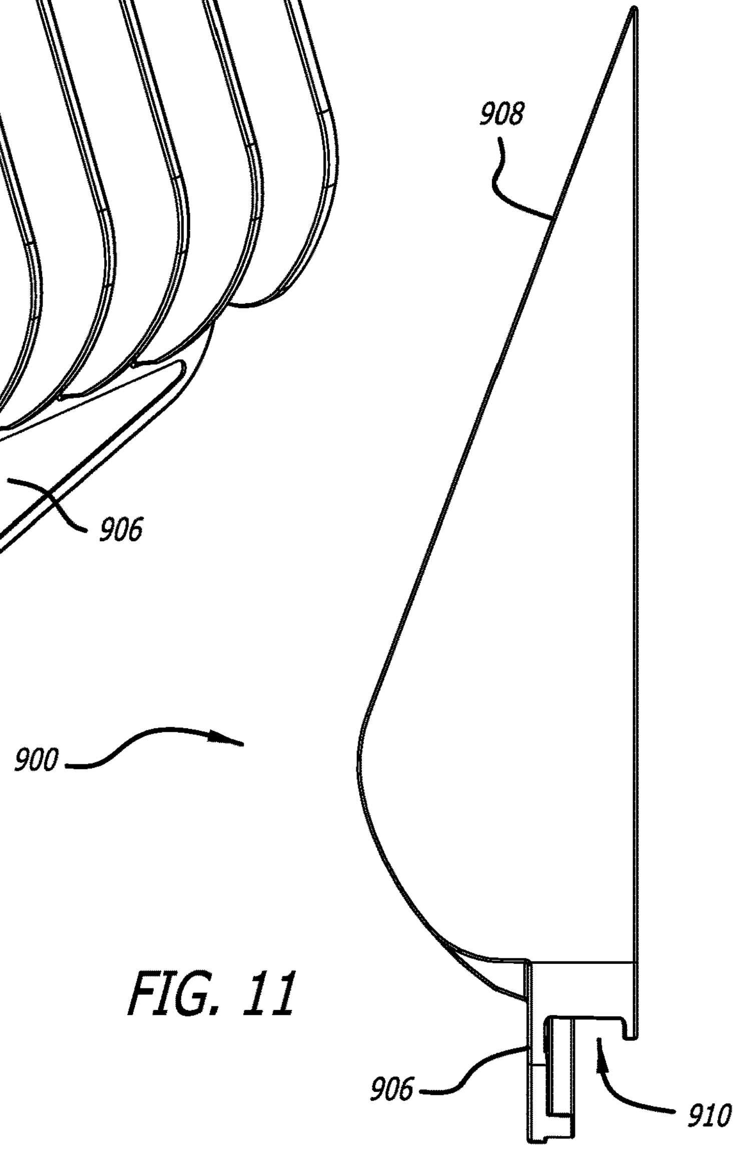
FIG. 11 is a perspective view of the right side of the guard attachment of FIG. 9.

FIGS. 9-11 show a second example of a guard attachment 900. FIG. 9 is a perspective view of the rear of a guard attachment 900. FIG. 10 is a perspective view of the front of the guard attachment 900, and FIG. 11 is a perspective view of the right side of the guard attachment 900.

Like the guard attachment 600 shown in FIGS. 6-9, guard attachment 900 includes a base portion 902 having a rear side 904 and a front side 906. In this example, the base portion 902 is shorter than the base portion 602 in the example shown in FIGS. 6-9. This causes the guard teeth 908 extending from the top of the base portion 902 of the guard attachment 900 to be in closer proximity to the cutting blades of the stationary blade 302 and moving blade 102, in the initial first position (a). Again, in this example, extending upward, toward the rear side 904 of the base portion 902, on both opposing sides of the base portion 902 are channel members 910 for moveably engaging the two opposing sides 314, 316 of the stationary blade 302 of the stationary blade assembly 300.

Again, a track 912 is provided on the rear side 904 of the base portion 902 for receiving the pin 304 of the lever 305 at track opening 914. Like in the example of FIGS. 6-9, the track 912 in the present example guides the pin 304 up and down the track 912, coming to a resting state in five different positions (a-e). Moving the lever 305 in one direction will cause the guard attachment 900 to move upward in a vertical direction relative to the stationary blade assembly 300 and moving the lever 305 in a second direction will cause the guard attachment 900 to move downward in a vertical direction relative to the stationary blade assembly 300.

In this example, the teeth 908 of the guard attachment 900, as they extend from the base portion 602 are not only angled downward at an approximate 20-21 degree angle, but the teeth are curved outward before they angel downward. In the example guard attachment 900, the teeth 908 are longer than those of the guard attachment 600.

Figure 12:
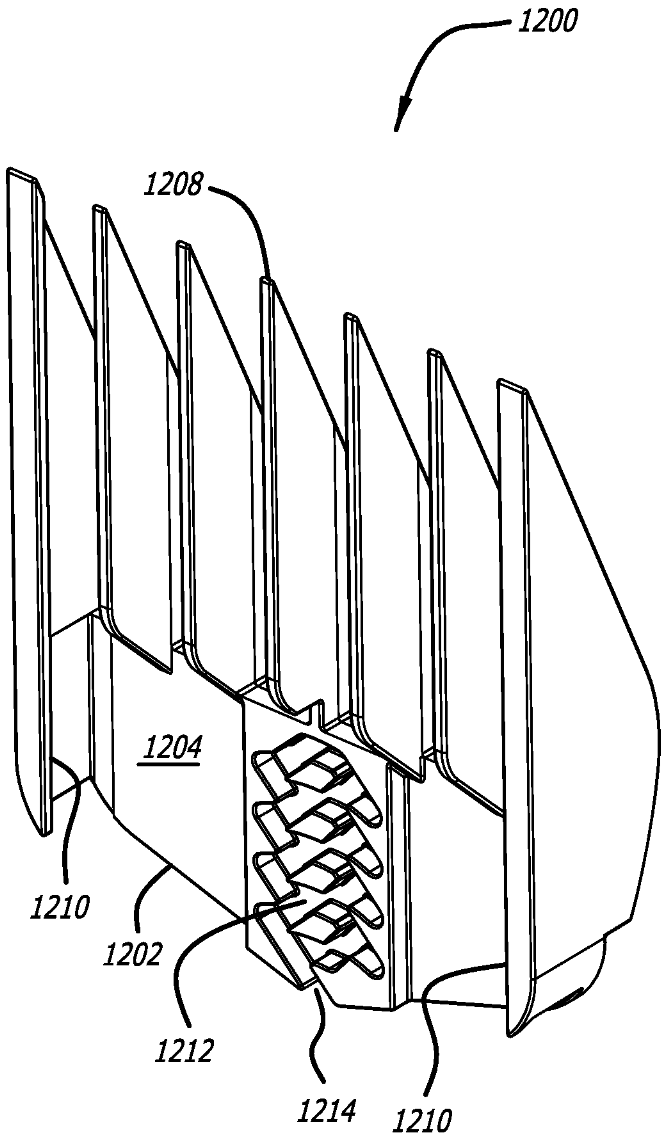
FIG. 12 is a perspective view of the rear of another alternative implementation of a guard attachment of the present invention.
Figure 13:
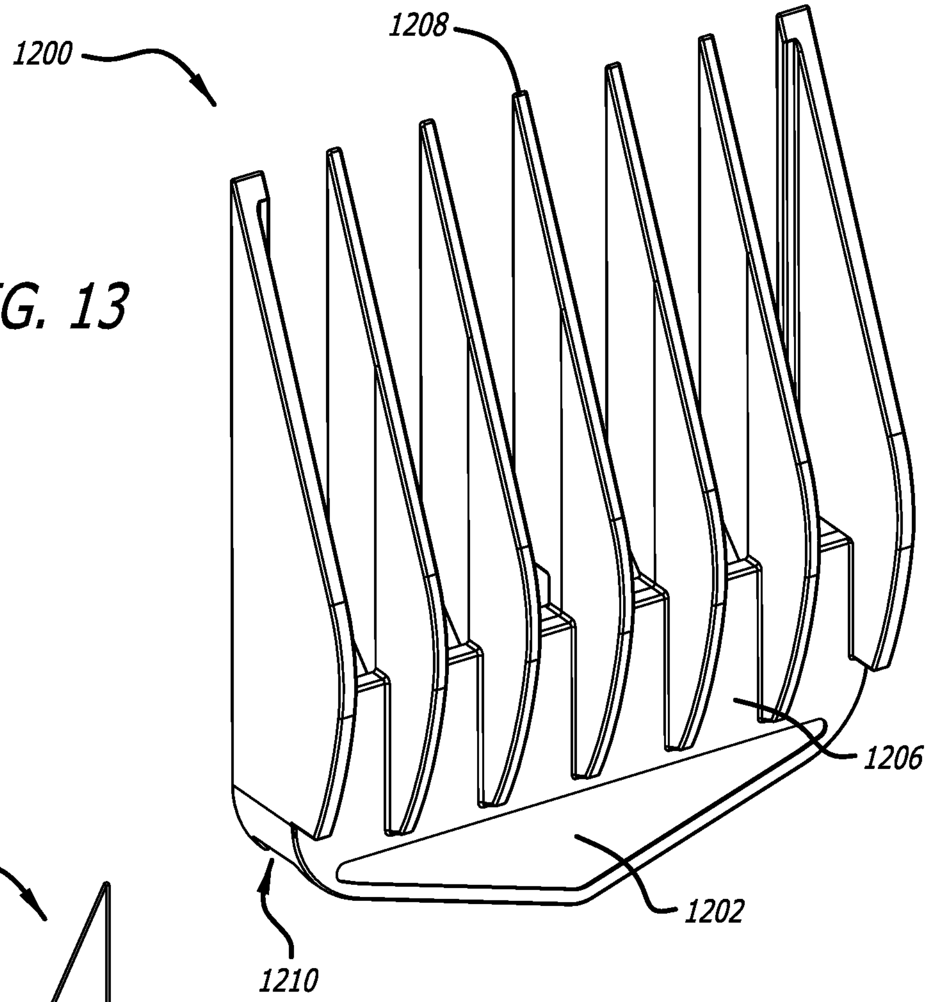
FIG. 13 is a perspective view of the front of the guard attachment of FIG. 12.
Figure 14:
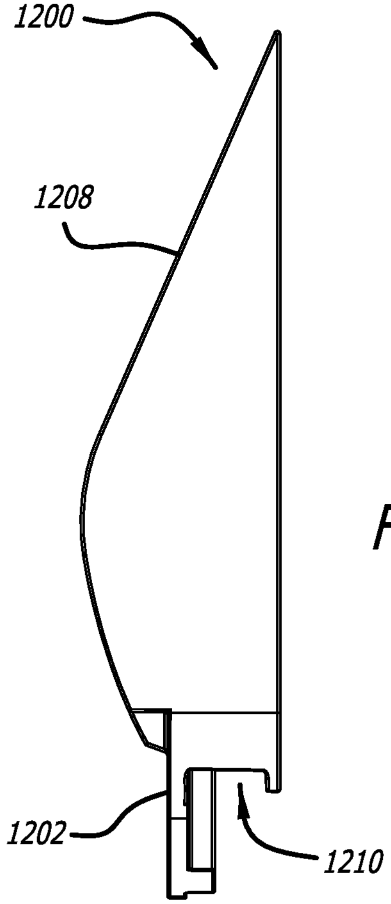
FIG. 14 is a perspective view of the right side of the guard attachment of FIG. 12.

FIGS. 12-14 show yet a third example of a guard attachment 1200. FIG. 12 is a perspective view of the rear of a guard attachment 1200. FIG. 13 is a perspective view of the front of the guard attachment 1200, and FIG. 14 is a perspective view of the right side of the guard attachment 1200.

Like in the prior examples, guard attachment 1200 includes a base portion 1202 having a rear side 1204 and a front side 1206. The guard attachment 1200 further includes guard teeth 1208 extending from the top of the base portion 1202 of the guard attachment 1200. Extending upward, toward the rear side 1204, on both opposing sides of the base portion 1202 are channel members 1210 designed to engage the two opposing sides 314, 316 of the stationary blade assembly 300.

A track 1212 is also provided on the rear side 1204 of the base portion 1202. The track 1212 receives the pin 1204 of the lever 305 at track opening 1214. The track 1212 in the present example guides the pin 304 up and down the track 1212, coming to a resting state in five different positions. Moving the lever 305 in one direction will cause the guard attachment 1200 to move upward in a vertical direction relative to the stationary blade assembly 300 and moving the lever 305 in a second direction will cause the guard attachment 1200 to move upward in a vertical direction relative to the stationary blade assembly 300. In this example, the teeth 1208 of the guard attachment 1200, as they extend from the base portion 1202, are angled downward at an approximate 20-21 degree angle, and, shown in this example, are also curved upward.

In all of the above examples, the track 612, 912, 1212 includes right and left (or first and second) pathways 625, 630 (FIG. 6) to move the guard attachments 600, 900 and 1200 to five different positions: a first (a), second (b), third (c), fourth (d) and fifth (e) position. With reference to FIG. 6, the first position occurs when the pin is at position a in the track. In this position, the free end of the teeth of the guard attachments are closest to the moving and stationary blades. The second position occurs when the pin is moved to position b. The third position occurs when the pin is moved to position c. The fourth position occurs when the pin is moved to position d and the fifth position occurs when the pin is moved to position e.

Further, in the above examples, moving the guard attachments between positions causes the length of the teeth from the stationary blade to increase or decrease incrementally in approximately ⅛$^{th}$ of an inch increments. In this manner, a single guard attachment can move over ½ an inch, which is the equivalent of using four to five standard sized guards. To create these positions, pegs 620 are included in the track 612 upon which the pin 304 rest, with right and left tracks positioned 625, 630 on each side.

Figure 15:
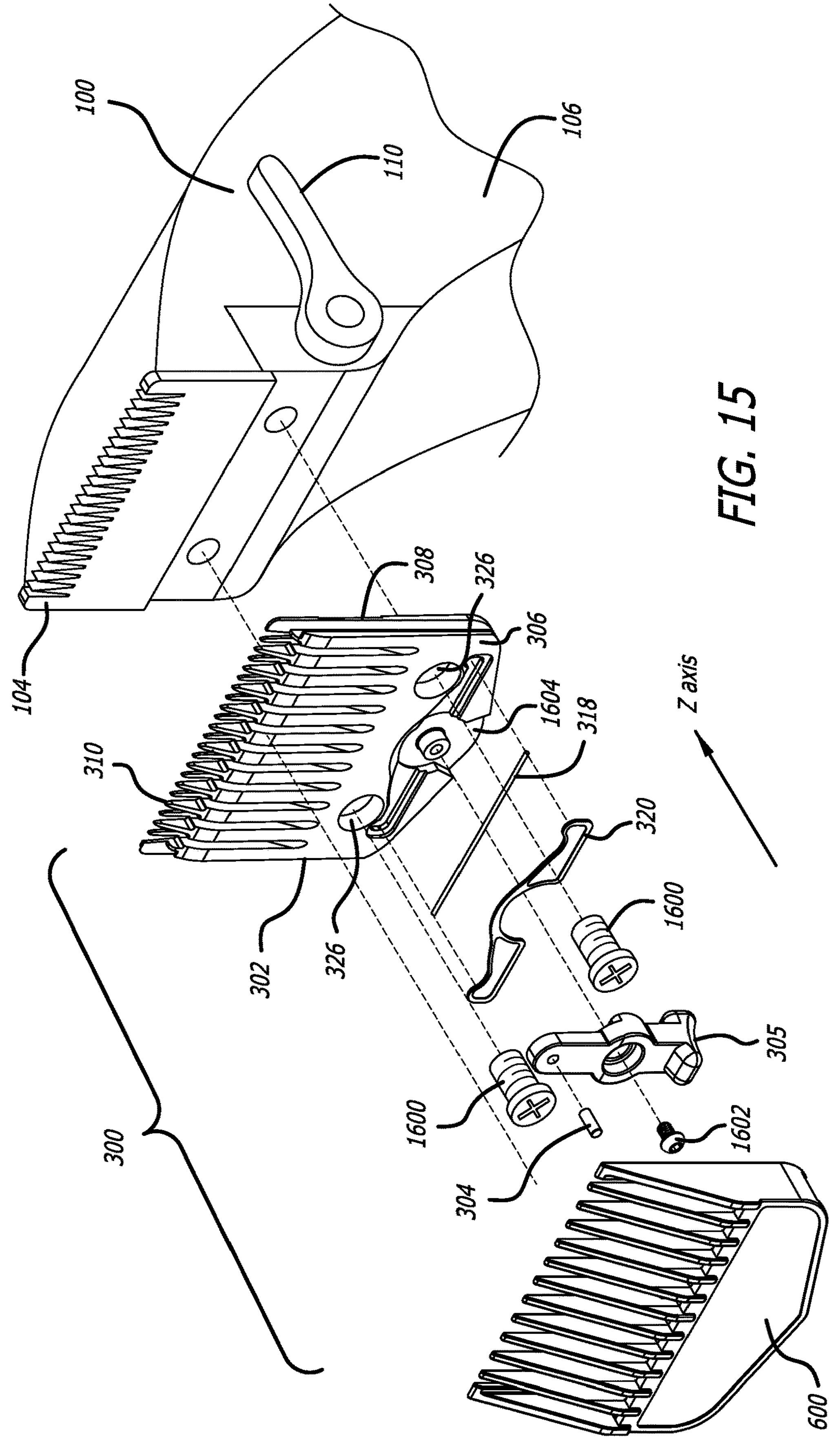
FIG. 15 is an exploded side view of the adjustable clipper blade assembly of the present invention illustrating how it would attach to electric hair clippers.

FIG. 15 is an exploded side view of the adjustable clipper blade assembly of the present invention illustrating how it would attach to electric hair clippers. In this example, guard attachment 600 is used for illustration purposes; however, those skilled in the art will recognize that other guard attachment, such as 900, 1200, having a base and teeth of other lengths and curvatures may also be used.

Hair clippers 100 include a movable cutting blade 104 attached to a housing 106. The stationary blade assembly 300 and guard attachment 600 is also shown. The stationary blade assembly 300 includes a stationary blade 302 having a front and rear face 306, 308 and a toothed edge 310. The stationary blade 302 includes two openings 326 for securing the stationary blade assembly 300 to the housing 106 using screws 1600. The stationary blade 302 further includes a recess 1604 and pivot attachment 322 for pivotally attaching the lever 305 to the stationary blade 302. The recess 1604 is designed to receive a spring rod 318 for creating tension on the lever 305 in both the clockwise and counterclockwise directions. The cover 320 is used to maintain the spring rod 318 in position. The lever 305 is pivotally secured to the stationary blade 302 with screw 1602. The lever 305 further includes a pin 304 for engaging a track 612 (FIG. 6) on the rear of the guard attachment 600. The guard attachment 600 includes side channels 610 for movable engaging the guard attachment 600 against the stationary blade assembly 300.

FIG. 16 is a perspective view of the right rear side of electric hair clippers 100 with the adjustable clipper blade assembly, including stationary blade assembly 300 and guard attachment 600 attached to the electric clippers 100. As shown, when assembled, the stationary blade 302 of the stationary blade assembly 300 rests flush against the movable blade 104 where the teeth of the movable blade 104 are in alignment with the teeth the stationary blade 302 of the stationary blade assembly 300.

Figure 17:
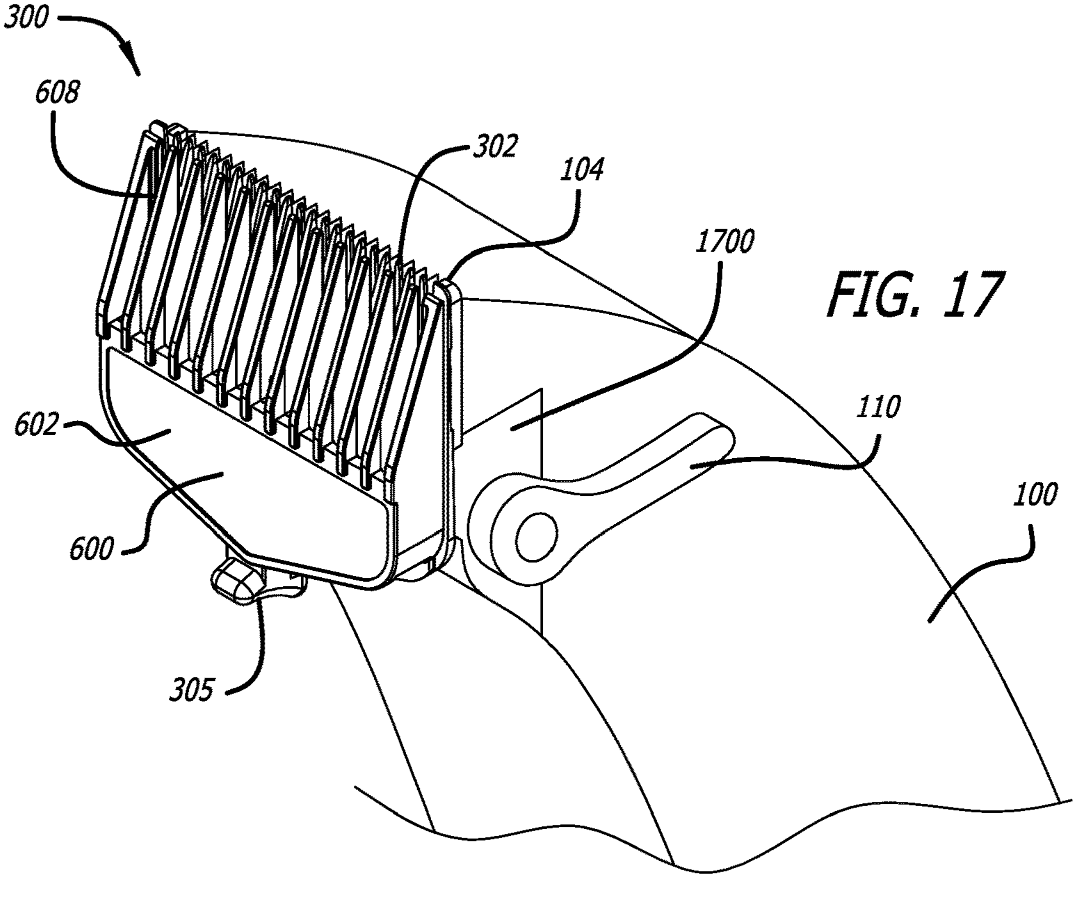
FIG. 17 is a perspective view of the right rear side of electric hair clippers with the adjustable clipper blade assembly attached to the electric hair clippers.

FIG. 17 is a perspective view of the right rear side of electric hair clippers 100 with the adjustable clipper blade assembly, including stationary blade assembly 300 and guard attachment 600 of FIG. 16 attached to the electric hair clippers 100. As shown, some hair clippers 100 include a movable mount 1700 to which the stationary blade assembly 300 is mounted. When attached to the movable mount 1700, lever 110 is able to slightly move the stationary blade 302 relative to the movable blade 104 by moving the movable mount 1700. Moving the movable mount 1700 using lever 110 further adjust the cutting length of the blades 302, 104. This is only a small adjustment; however, since the stationary blade assembly 300 attaches to the hair clippers 100 in the same manner as other prior art stationary blades 104 attach to the movable mount 1700, lever 110 is also able to move the stationary blade assembly 300 relative the movable blade 102.

Figure 18:
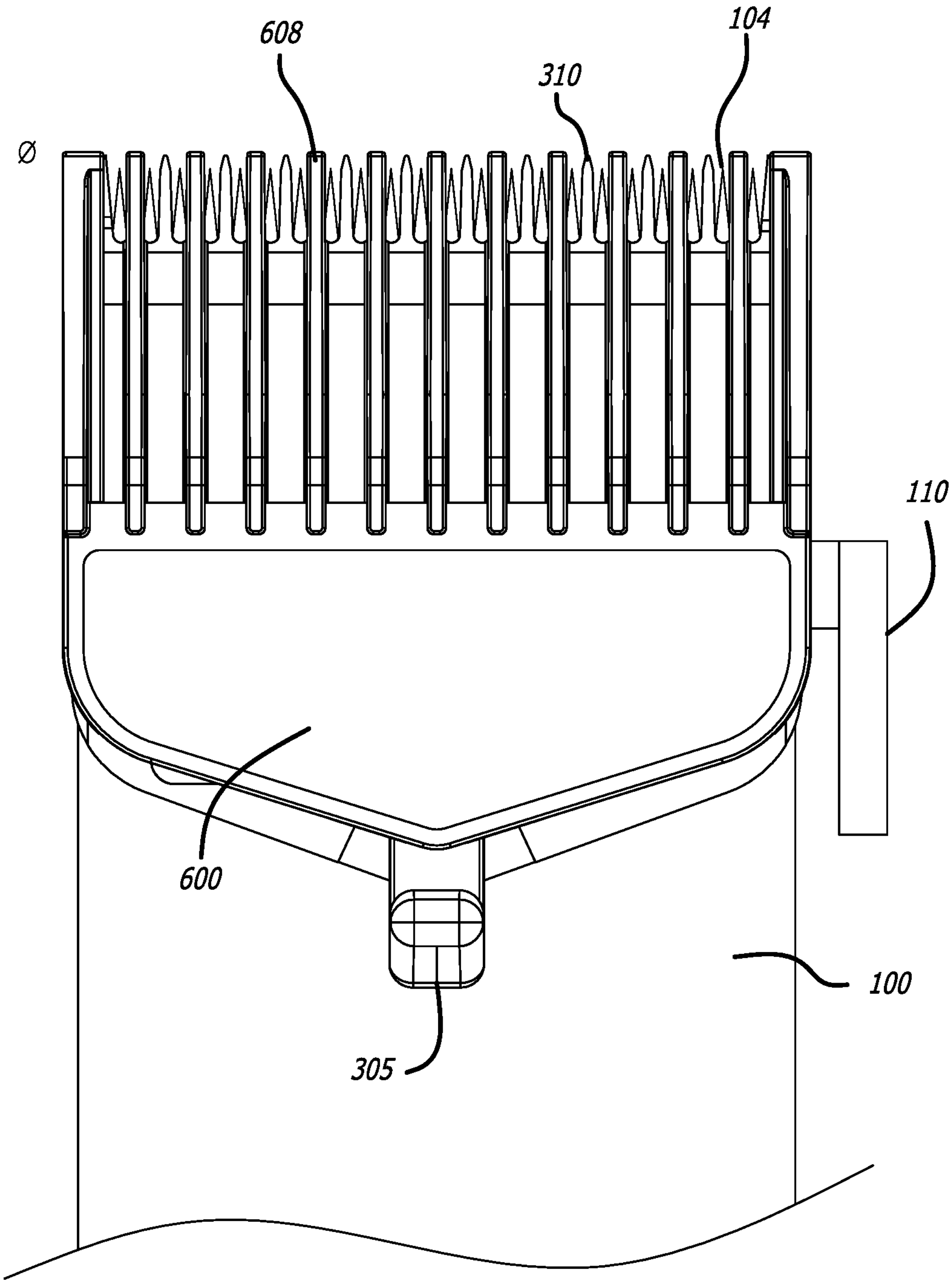
FIG. 18 is a rear view of electric hair clippers with the adjustable clipper blade assembly of FIG. 17 shown in a first position.

FIG. 18 is a rear view of electric hair clippers 100 with the adjustable clipper blade assembly of FIG. 16 shown in a first position. In this position, the pin 304 of the lever 305 is in first position a, as shown in FIG. 6. In this example, the free end of the teeth 608 of the guard attachment 600 are approximately even with or slightly past the top of the teeth 310 of the stationary blade 302.

Figure 19:
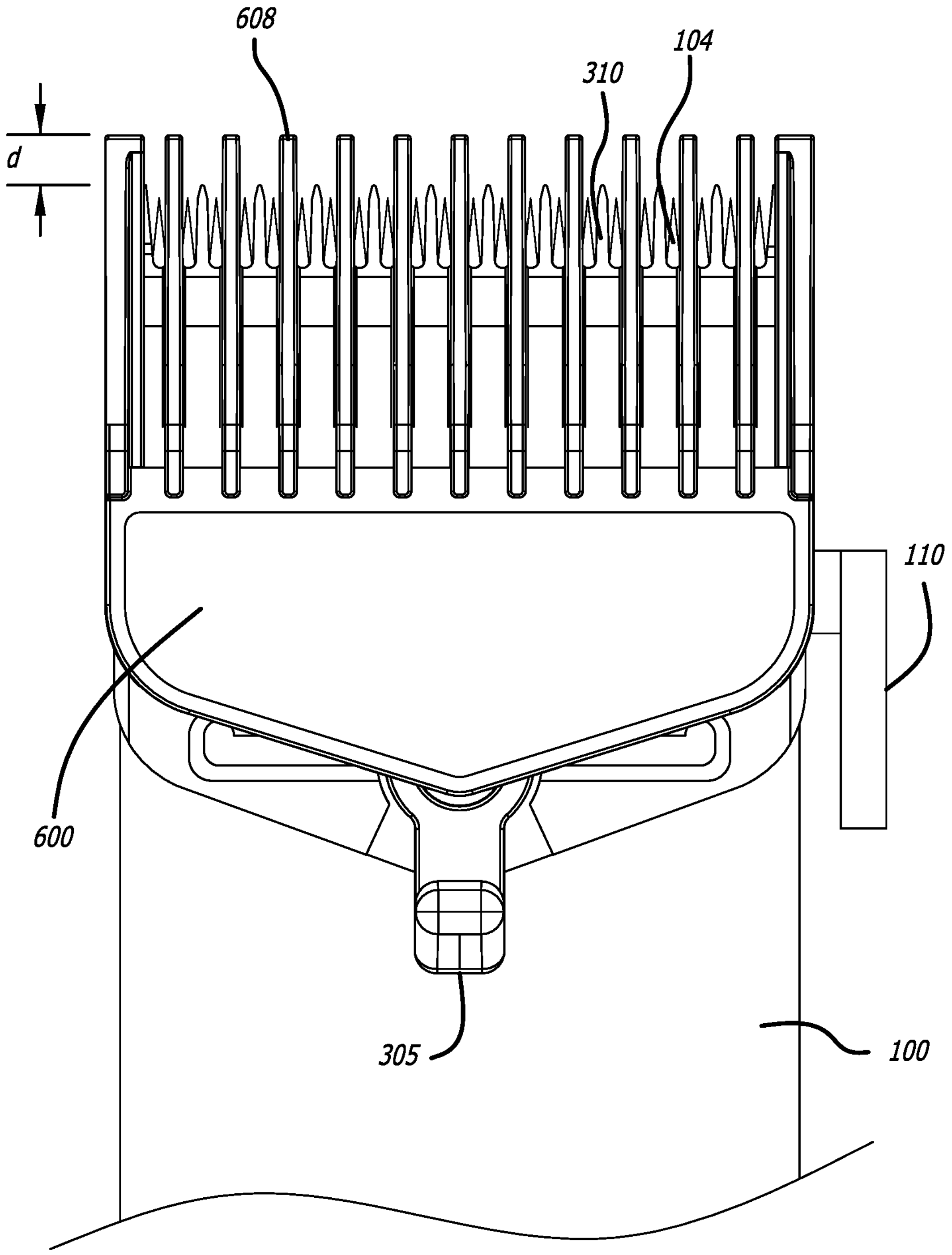
FIG. 19 is a rear view of an electric hair clippers with the adjustable clipper blade assembly of FIG. 17 shown in a second position.

FIG. 19 is a rear view of electric hair clippers 100 with the adjustable clipper blade assembly of FIG. 16 shown in a second position. In this position, the pin 304 of the lever 305 is in position b, as shown in FIG. 6. In this example, the free end of the teeth 608 of the guard attachment 600 are at a distanced from the top of the teeth 310 of the stationary blade 302, which is approximately an ⅛ of an inch or 3 mm higher than when in the first position a.

Figure 20:
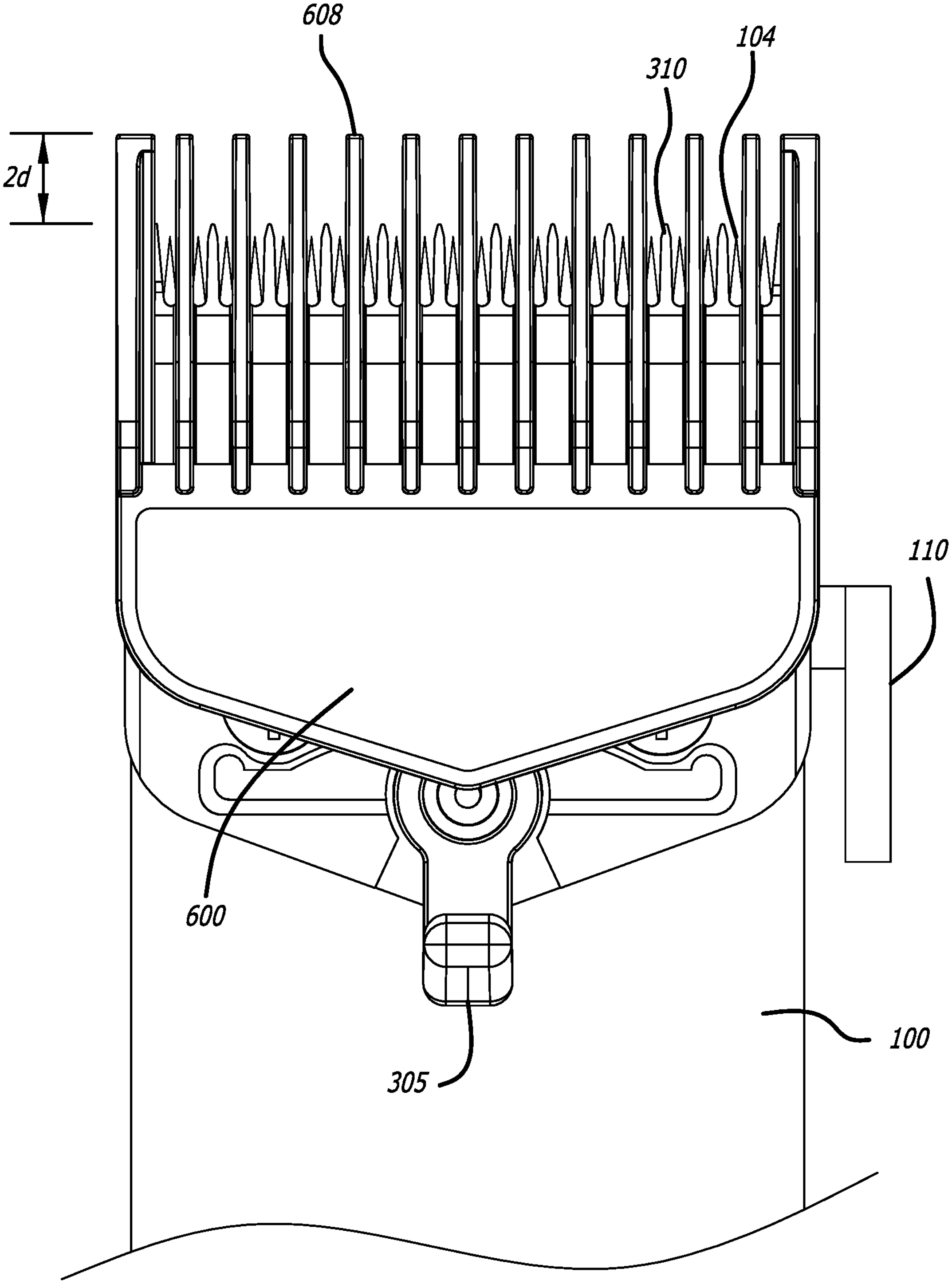
FIG. 20 is a rear view of an electric hair clippers with the adjustable clipper blade assembly of FIG. 17 shown in a third position.

FIG. 20 is a rear view of an electric hair clippers 100 with the adjustable clipper blade assembly of FIG. 16 shown in a third position. In this position, the pin 304 of the lever 305 is in position c, as shown in FIG. 6. In this example, the free end of the teeth 608 of the guard attachment 600 are at a distance **2*d* from the top of the teeth 310 of the stationary blade 302**, which is approximately an ⅛ of an inch or 3 mm higher than when in the second position b.

Figure 21:
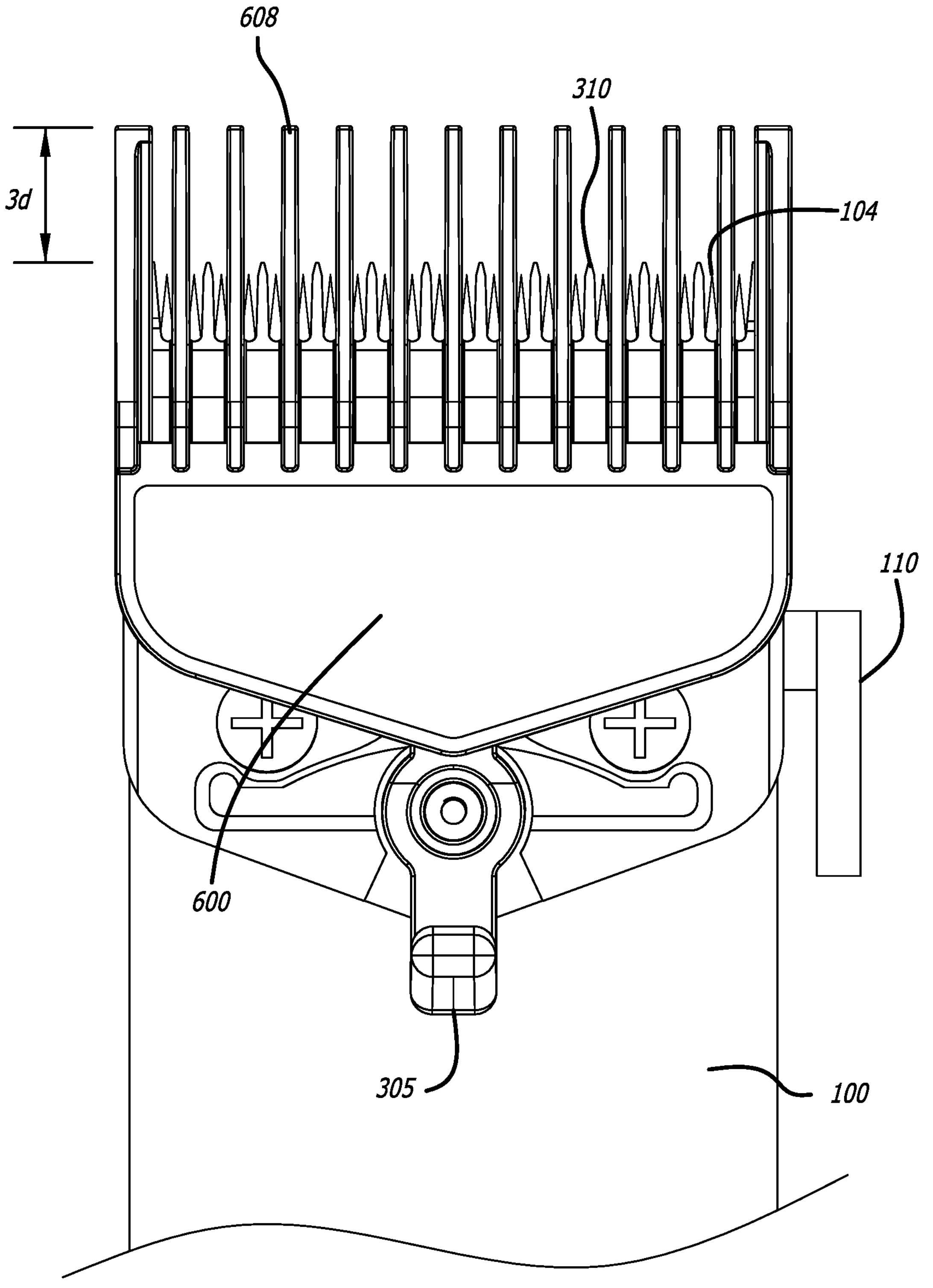
FIG. 21 is a rear view of an electric hair clippers with the adjustable clipper blade assembly of FIG. 17 shown in a fourth position.

FIG. 21 is a rear view of an electric hair clippers 100 with the adjustable clipper blade assembly of FIG. 16 shown in a fourth position. In this position, the pin 304 of the lever 305 is in position d, as shown in FIG. 6. In this example, the free end of the teeth 608 of the guard attachment 600 are at a distance **3*d* from the top of the teeth 310 of the stationary blade 302**, which is approximately an ⅛ of an inch or 3 mm higher than when in the third position c.

Figure 22:
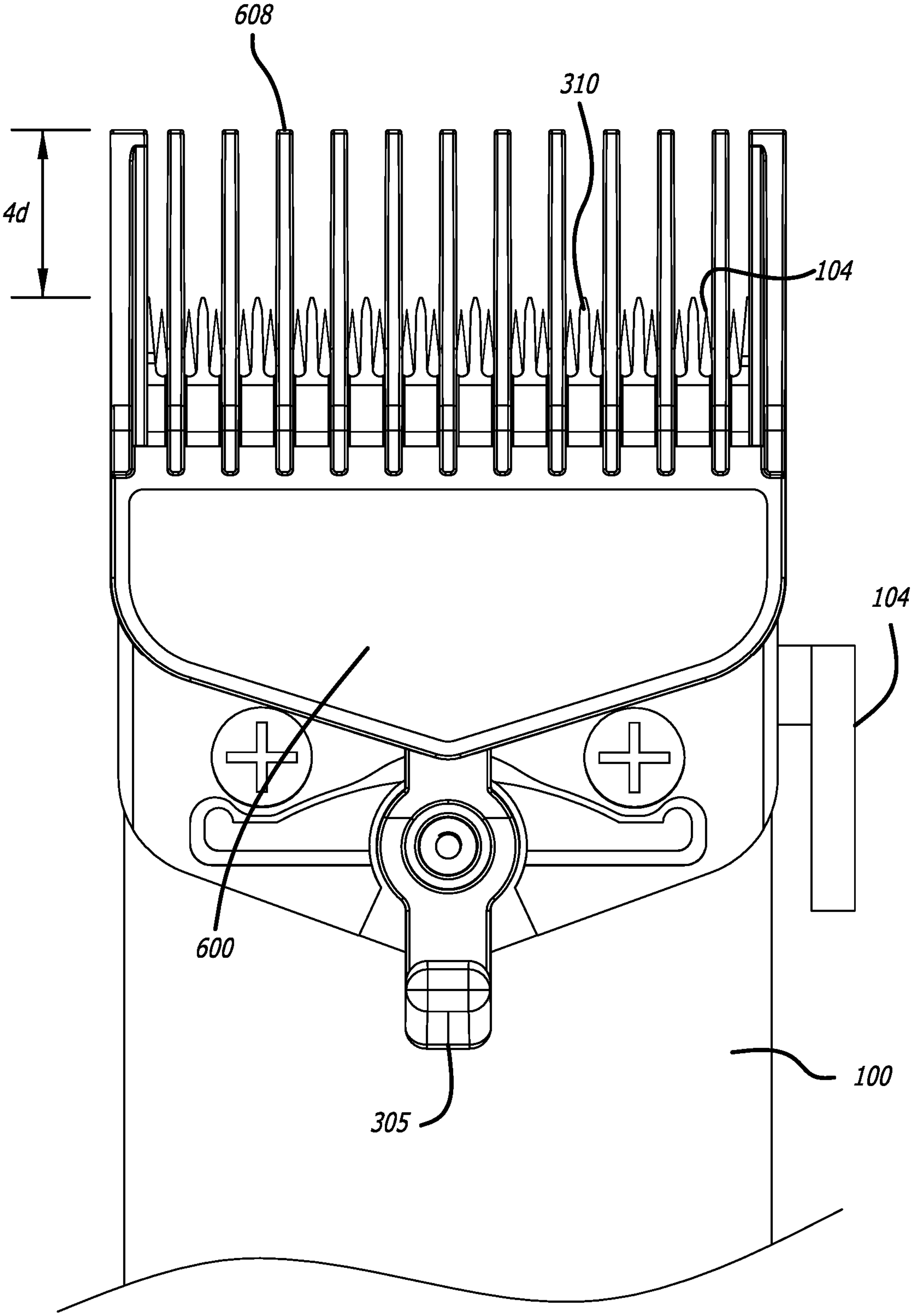
FIG. 22 is a rear view of an electric hair clippers with the adjustable clipper blade assembly of FIG. 17 in a fifth position.

FIG. 22 is a rear view of an electric hair clippers 100 with the adjustable clipper blade assembly of FIG. 16 in a fifth position. In this position, the pin 304 of the lever 305 is in position e, as shown in FIG. 6. In this example, the free end of the teeth 608 of the guard attachment 600 are at a distance **4*d* from the top of the teeth 310 of the stationary blade 302**, which is approximately an ⅛ of an inch or 3 mm higher than when in a fourth position d.

In this above illustrated example, the lever 305 incrementally moves the guard attachment 600 relative to the stationary blade assembly 300 to five different positions. Those skilled in the art will recognize additional incrementally positions beyond five positions could be provided by the track 612, pin 304 and lever 305 assembly, or less than five incremental positions could be provided by the track 612, pin 304 and lever 305 assembly. For example, the guard assembly 600 could be incrementally moved up and down relative to the stationary blade assembly 300 into at least two positions, at least three positions, at least four positions or at least five positions.

Besides the number of incrementally movements varying, the distance of each incremental movement may also vary from the provided example. The illustrated example shows each incrementally position moving the guard assembly 600 up and down relative to stationary blade assembly 300 by approximately an ⅛ of an inch or 3 mm higher. In total, the guard attachment 600 of the present attachment moves the guard attachment 600 relative to the stationary blade assembly 300 over a ½ inch. With five increments, the guard attachment 600 is moved approximately or slightly more than ½ of an inch. While incremental movements of approximately ⅛ of an inch or 3 mm is desired, with a total of five increments, moving the over ½ inch is desired, those skilled in the art will recognize that both the number of incrementally movements and distance of the incremental movements may vary without departing from the scope of the invention. For example, the incremental movements may be anywhere from approximately 1/16 of an inch to approximately ¼ of an inch or more.

Given that the guard attachments 600, 900, 1200 may include teeth of varying lengths and curvature, the pin 304 of the lever 305, when in a first position a, may not result in the free end of the teeth 608 of the guard attachment 600, for example, being approximately even with or slightly past the top of the teeth 310 of the stationary blade 302. For example, a particular guard attachment in the first position a may start with the free end of the teeth of the guard attachment being approximately a ¼ inch or approximate ½ inch or even more away from the free end of the teeth 310 of the stationary blade 302.

As set forth above, because stationary blade 302 is secured to the housing 106 of the hair clippers by two screws 1600 spaced apart a distance that is standard for most professional hair clippers, the above example illustrates an adjustable clipper blade assembly having a stationary blade assembly and guard attachment capable of being retrofitted and used with existing prior art clippers. However, those skilled in the art will recognize that the present invention may also be incorporated into and used with new electric hair clipper. Accordingly, the adjustable clipper blade assembly can be sold separately or sold as part of new electric hair clippers. Further, one or more guard attachments can be designed for use with and sold with the stationary blade assembly. Various guard attachments may also be sold separately.

In operation, the side channels 610, 910, 1210 of a guard attachment 600, 900, 1200 engage the opposing sides 312, 314 of the stationary blade 302 of the stationary blade assembly 300. Once the guard attachment 600, 900, 1200 is moveably engaged with the stationary blade of the blade assembly, the pin 304 on the lever 305 can engage the track 612, 912, 1212 on the guard attachment 600, 900, 1200 though the track inlet 614, 914, 1214.

Mating the guard attachment 600, 900, 1200 with the stationary blade assembly 300 is accomplished by sliding the bottom edge of the side channels 610, 910, 1210 of the guard attachment 600, 900, 1200 onto the top of the opposing sides of stationary blade 302 of the stationary blade assembly 300. When the guard attachment 600, 900, 1200 is slide onto the stationary blade assembly 300, the lever 305 is moved slightly in one direction to allow the pin 304 to align with the track inlet 614, 914, 1212 of the track 612, 912 and 1212 on the guard attachment 600, 900, 1200. Once the pin 304 is engaged with the track 612, 912, 1212, the lever 305 can then move the pin 304 up and down the right and left sides of the track, cause the guard attachment 600, 900, 1200 to move in a first direction when the lever 305 is moved in a first direction and causing the guard attachment 600, 900, 1200 to move in a second direction when the lever 305 is moved in a second direction. More particularly, movement of the lever 305 in the first direction can cause the guard attachment 600, 900, 1200 to move upward relative to the stationary blade 302 along the y-axis. Movement of the lever 305 in the second direction can cause the guard attachment 600, 900, 1200 to move downward relative to the stationary blade 302. To remove the blade, the lever 305 cause the guard attachment to move upward to its farthest point where the pin 304 can exit the track with a slight movement of the lever 305. At this point, the guard attachment 600, 900, 1200 can be slide upward and off the stationary blade assembly 300.

While the invention teaches the use of the guard attachment 600, 900, 1200 having side channels 610, 910, 1210 to engage the opposing sides 312, 314 of the stationary blade 302, those skilled in the art will recognize that other guide mechanisms can be used to moveably secure the guard attachment 600, 900, 1200 and the stationary blade 302 against one another. For example, the guard attachment 600, 900, 1200 can moveably engage the stationary blade assembly 300 by sliding, clipping, snapping or securing the guard attachment 600, 900, 1200 to the stationary blade assembly 300 such that the guard attachment 600, 900, 1200 is moveably engaged with the stationary blade assembly 300 in the vertical direction.

Further, those skilled in the art will recognize that other mechanisms may be used to advance and retract the guard attachment on the stationary blade assembly other than the track, pin and lever described in this application. Other tracks, guides or advancement mechanisms, similar to those use in other mechanical devices, such as mechanical pencils or retractable utility knives may be used to extend and retract the guard attachment without departing from the scope of the invention.

It will be understood that various aspects or details of the invention may be changed without departing from the scope of the invention. Furthermore, the foregoing description is for the purpose of illustration only, and not for the purpose of limitation—the invention being defined by the claims.

What is claimed is:

1. An adjustable clipper blade assembly for use with hair clippers, the adjustable clipper blade assembly comprising:

- a stationary blade assembly comprising:
  - a stationary blade having front and rear faces, a toothed edge, a bottom edge and opposing side edges; and
  - a lever arm pivotally attached to the front face of the stationary blade, the lever arm having a pin extending from the lever arm perpendicular to the front face of the stationary blade, and
- a guard attachment having two opposing side channels that moveably engage with the opposing side edges of the stationary blade, the guard attachment having a base portion with teeth extending from the base portion, the base portion further including a track for engaging the pin on the lever arm, whereby the movement of the lever arm moves the pin in the track of the guard attachment causing the guard attachment to move relative to the stationary blade assembly in increments.

2. The adjustable clipper blade assembly of claim 1, where the lever arm is a double acting spring lever pivotally attached to the front face of the stationary blade.

3. The adjustable clipper blade assembly of claim 2, where the track of the guard attachment includes both left and right side tracks with at least four pegs for allowing the guard attachment to incrementally move upward relative to the stationary blade when the double acting spring lever is moved in a first direction and to incrementally move downward relative to the stationary blade when the double acting spring lever is moved in a second direction.

4. An adjustable clipper blade assembly for use with hair clippers, the adjustable clipper blade assembly comprising:

- a stationary blade including a toothed edge, a bottom edge and two opposing side edges, the stationary blade having a lever attached to the stationary blade; and
- a guard attachment having two opposing side channels for moveably securing the guard attachment to a stationary blade, whereby the lever of the stationary blade interfaces with the guard attachment to move the guard attachment relative to the stationary blade to move the guard attachment in a first direction when the lever is moved in a first direction and to move the guard attachment in a second direction when the lever is moved in a second direction.

5. The adjustable clipper blade assembly of claim 4, where the stationary blade includes a front face and a rear face and the lever is a double acting spring lever pivotally attached to the front face of the stationary blade.

6. The adjustable clipper blade assembly of claim 4, where the two opposing side channels of the guard attachment moveably engage the opposing side edges of the stationary blade.

7. The adjustable clipper blade assembly of claim 4, where the lever includes an arm having a pin and where the guard attachment has a base portion with teeth extending from the base portion, the base portion further including a track for engaging the pin on the lever where the movement of the lever moves the pin in the track of the guard attachment causing the guard attachment to move relative to the stationary blade assembly in predetermined increments.

8. The adjustable clipper blade assembly of claim 7, where the track of the guard attachment includes both left and right side tracks with at least two pegs for allowing the guard attachment to incrementally move upward relative to the stationary blade when the double acting spring lever is moved in a first direction and to incrementally move downward relative to the stationary blade when the double acting spring lever is moved in a second direction.

9. The adjustable clipper blade assembly of claim 8 where the track includes at least three pegs.

10. The adjustable clipper blade assembly of claim 9, where the track includes at least four pegs.

11. Hair clippers for cutting hair, the hair clippers comprising:

a housing;

a set of cutting blades attached to the housing, the set of cutting blades including both a stationary blade having teeth and a moveable blade having teeth, where the movable blade is positioned between the stationary blade and the housing with the teeth of the movable blade in alignment with the teeth of the stationary blade;

the stationary blade further including a lever attached to the stationary blade for interfacing with a guard attachment that is moveably secured against the stationary blade where the lever moves the guard attachment in a first direction when the lever is moved in a first direction and moves the guard attachment in a second direction when the lever is moved in a second direction.

12. The hair clippers of claim 11 where the stationary blade has a front and rear face and where the lever is a double acting spring lever pivotally attached to the front face of the stationary blade.

13. The hair clippers of claim 11, where the guard attachment includes two opposing side channels that moveably engage with opposing side edges of the stationary blade.

14. The hair clippers of claim 11, where the lever includes an arm having a pin and where the guard attachment has a base portion with teeth extending from the base portion, the base portion further including a track for engaging the pin on the lever where the movement of the lever moves the pin in the track of the guard attachment causing the guard attachment to move relative to the stationary blade assembly in predetermined increments.

15. The hair clippers of claim 14, where the track of the guard attachment includes both left and right side tracks with at least two pegs for allowing the guard attachment to incrementally move upward relative to the stationary blade when the double acting spring lever is moved in a first direction and to incrementally move downward relative to the stationary blade when the double acting spring lever is moved in a second direction.

16. The hair clippers of claim 15 where the track includes at least three pegs.

17. The hair clippers of claim 15, where the track includes at least four pegs.

* * * * *